United States Patent [19]

Fiedler

[11] Patent Number: 4,572,158

[45] Date of Patent: Feb. 25, 1986

[54] TRIGGER TO ACTIVATE AQUEOUS SALT SOLUTION FOR USE IN A HEAT PACK AND METHOD OF MAKING THE SAME

[75] Inventor: Marc F. Fiedler, Los Angeles, Calif.

[73] Assignee: Topazon Limited, Hong Kong, Hong Kong

[21] Appl. No.: 650,237

[22] Filed: Sep. 12, 1984

[51] Int. Cl.⁴ .............................................. F24J 1/00
[52] U.S. Cl. .................................. 126/263; 44/3 A; 422/245
[58] Field of Search .............. 126/263, 400, 204, 206; 44/3 A, 3 R; 422/245; 128/403

[56] References Cited

U.S. PATENT DOCUMENTS 4,077,390  3/1978  Stanley et al. ..................... 126/263
4,379,448  4/1983  Kapralis et al. .................... 126/263
4,460,546  7/1984  Kapralis et al. ................ 126/263 X Primary Examiner—Randall L. Green
Attorney, Agent, or Firm—Harlan P. Huebner

[57] ABSTRACT

A trigger to activate a supercoolable aqueous salt solution wherein the trigger and solution are encased within a flexible container. The trigger is a flexible relatively thin sheet of material wherein there are a plurality of activator cuts that extend through the thin sheet material and the shape of each slit includes a first or central slit and a minor slit that extends through the thin sheet material at one end of said first slit and at an angle to the direction of the major slit. In addition the method of making the trigger is accomplished by punching, forming, dishing and cutting the end product to its exterior dimension.

9 Claims, 15 Drawing Figures

U.S. Patent  Feb. 25, 1986  4,572,158
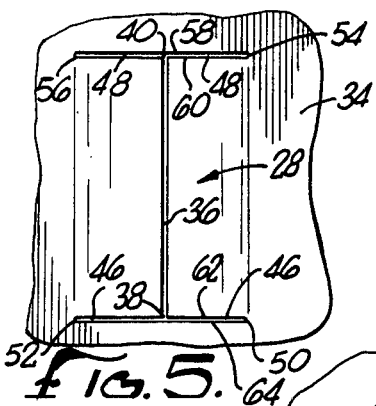
fig.5.
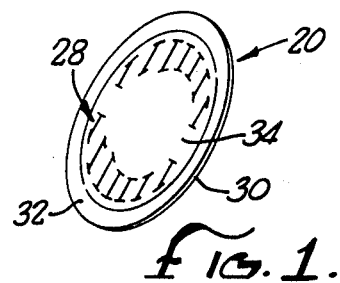
fig.3.
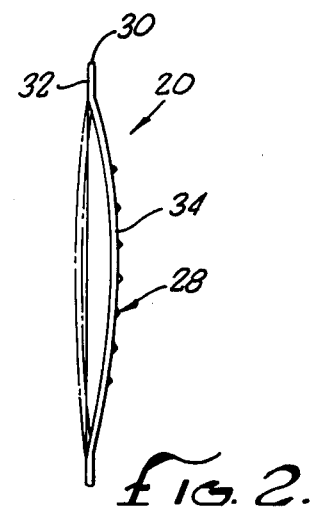
fig.1.
fig.2.
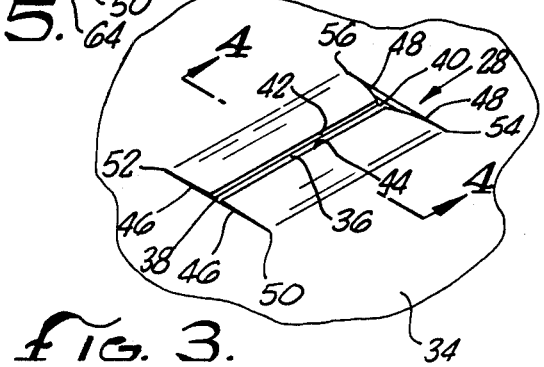
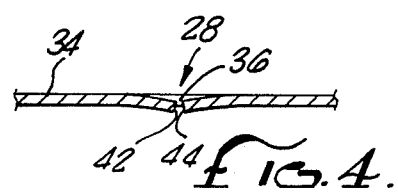
fig.4.
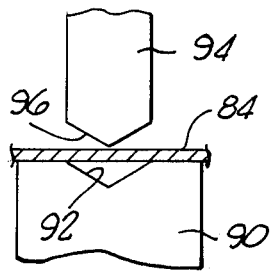
fig.6.
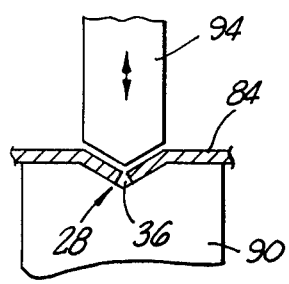
fig.7.
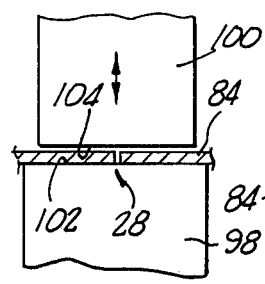
fig.8.
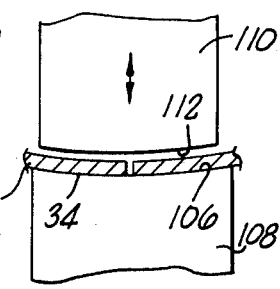
fig.9.
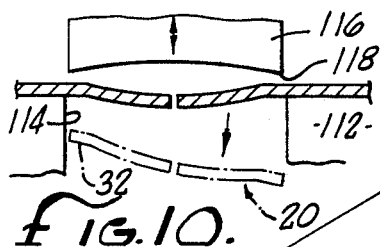
fig.10.
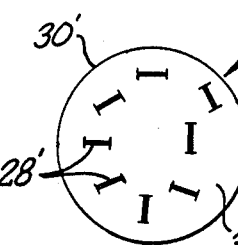
fig.12.
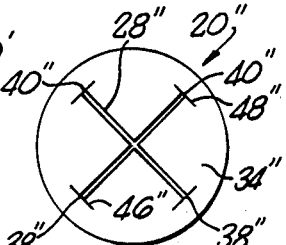
fig.13.
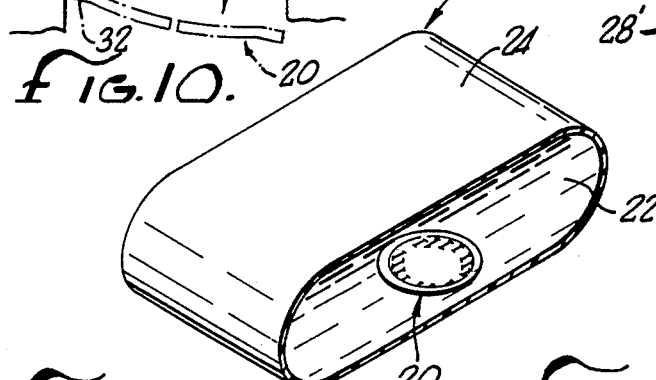
fig.11.
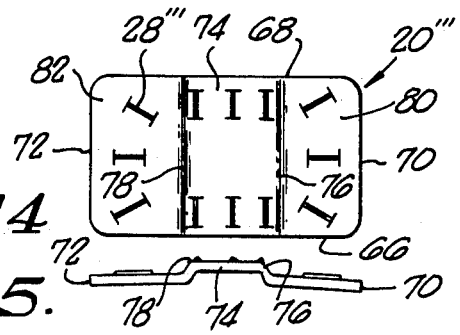
fig.14.
fig.15.

TRIGGER TO ACTIVATE AQUEOUS SALT SOLUTION FOR USE IN A HEAT PACK AND METHOD OF MAKING THE SAME

BACKGROUND OF THE INVENTION

This invention relates to a trigger to activate a supercoolable aqueous salt solution wherein the trigger and solution are encased within a flexible container to form a heat pack.

Heat packs utilizing supercoolable aqueous salt solutions have been used for some time for the treatment of soreness of muscles of athletes and sportsman in localized areas. From the simple hot water bottle we have progressed upward to the use of supercoolable aqueous salt solutions wherein the temperatures can be controlled as well as the duration of the heat given off. Various solutions such as sodium acetate and calcium nitrate tetrahydrate are examples of such solution.

In the past the scraping of metal to metal has initiated crystalization of the solution or inserting a crystal in the solution has also been used.

With the advent of the invention by Messrs Stanley and Hoerner of a trigger as setforth in U.S. Pat. No. 4,077,390 and the trigger of Messrs. Kapralis and Krukle as setforth in U.S. Pat. No. 4,379,448, a new means has been found to initiate the crystalization of the solution. In the case of U.S. Pat. No. 4,077,390 a trigger of a metal strip that is flexible which includes a number of fissures therein has been used. The trigger is placed in the heat pack container with the solution and the pack is sealed. To initiate the crystalization the trigger is flexed and as presently understood the flexing produces minute continuances of the fissures and these continuances or fractures will initiate the action.

The Kapralis et al U.S. Pat. No. 4,379,448 modified the teachings of U.S. Pat. No. 4,077,390 by placing slits on the inside of the trigger with none of them extending the to marginal edges of the strip. In addition, the inventors claim the permanent positioning of the trigger in a set spot, such as the corner of the pack.

Each of the above triggers have to some extent proved faulty. This is particularly true of U.S. Pat. No. 4,077,390 where continual bending to initiate crystallizaion has created a breaking of the triggers along the line of the slits or cuts. This results in failures of the triggers and in some cases the broken metal can cause punctures in the heat pack and leakage of the salt solution.

SUMMARY OF THE INVENTION

It is a primary object of the present invention to provide a trigger to activate an aqueous salt solution whereby an exothermic reaction is caused, wherein the trigger includes an activator cut with a plurality of areas of exposure which may initiate crystallization of the solution.

Yet another object of the invention is to provide a plurality of activator points associated with minor slits which points when flexed will start the crystallization.

A further object of the invention is to provide a trigger which is dished or bowed having a plurality of activator cuts therein, wherein each cut includes a first elongated slit extending through the thickness of the trigger and at least one additional second or minor slit extending at an angle from at least one terminus of the first elongated slit.

Another object of the present invention is to provide a trigger which due to construction of the activator cuts therein will prevent undue strss on the activator cuts when the trigger is snapped or activated by finger pressure and prevent breakage.

These and other objects and advantages of the invention will become apparent from the following part of the specification wherein details have been described for the competence of disclosure, without intending to limit the scope of the invention which is setforth in the appended claims.

BRIEF DESCRIPTION OF THE DRAWINGS

The above advantages may be more clearly understood from the following detailed description and by reference to the drawings in which:

FIG. 1 is a perspective view of the trigger of the present invention;

FIG. 2 is an enlarged end view of the trigger in its dished shape with ghost lines representing its snapped or activating second position;

FIG. 3 is an enlarged perspective view of one activator cut in the trigger;

FIG. 4 is a cross sectional view taken on line 4—4 of FIG. 3;

FIG. 5 is an enlarged top elevational view of one of the activator cuts of the trigger;

FIGS. 6 through 10 are schematic representations of steps for forming the trigger and activator cuts from thin sheet material;

FIG. 11 is an environmental view of the trigger mounted in a heat pack container of aqueous salt solution capable of being crystallized for an exothermic reaction;

FIG. 12 is a top plan view of a modified trigger;

FIG. 13 is a top plan view of a trigger with a further modified arrangement of activator cuts;

FIG. 14 is a top plan view of a further modified trigger construction; and

FIG. 15 is a side elevation of the modified trigger construction of FIG. 14.

DETAILED DESCRIPTION OF THE PREFERRED EMBODIMENTS

Referring initially to FIGS. 1 and 2 there is illustrated a trigger generally designated 20. The trigger is to be used to activate an aqueous salt solution 22, see FIG. 11 which is encased in a preferably flexible container 24 forming a heat pack 26. The trigger 20 is flexible and when snapped or distorted, see FIG. 2, causes the solution 22 to crystallize and an exothermic reaction ensues. The solution 22 may be any of a variety of chemical compositions which as they crystallize give off heat through the container 24 and the heat pack 26 may be applied to an area of the body to be treated.

The solution 22 is also preferably of such a composition that after crystallization and the exothermic reaction ceases the heat pack 26 may be reused by boiling the same in hot water which converts the crystallized solution back into liquid condition for reuse.

Experimentation has shown that the actual triggering or starting of crystallization of solution 22 is caused by the exposing of a new metal surface to the solution. While in the past the rubbing of metal to metal has been used to create a new surface, the present invention utilizes the minute tearing of metal wherein new surfaces of the metal are exposed to the solution 22.

To accomplish this microscopic trearing of metal it is preferred that the trigger 20 have a plurality of activator cuts, generally designated 28. In this way one or more such tearings will assure the desired results.

The trigger 20 is preferably circular and is adapted to be deformed. Trigger 20 is a relatively thin metallic disc, with a perimeter or marginal edge 30. The marginal edge 30 is generally smooth without irregularities that could cut into the flexible container 24.

Trigger 20 includes an annular rim 32 which is generally coplanar there around. Extending inwardly from the rim 32 is a dish shaped portion 34 which curves away from the coplanar surface of the rim 32.

Formed within the dish shaped portion 34 is at least one activator cut 28 that extends through the thickness of the relatively thin metal, see FIGS. 3, 4 and 5. In actual practice it may be preferred to form several activator cuts 28 in the trigger 20.

The activator cuts 28 each preferably include a central or first elongated slit 36 through the thickness of the metal terminating in first and second ends 38 and 40. The slit 36 may be straight, as illustrated, or may be curved, zig-zag, etc., but in either event the edges 42 and 44 of the slit 36 do not touch.

At the terminus points 38 and 40 of the activator cut 28 there are minor slits 46 and 48 branching therefrom. The slits 46 and 48 may extend on both sides of the central slit 36 forming an "I" or only on one side. In addition the minor slits 46 and 48 are at an angle relative to the length of the central elongated slit 36. In the preferred embodiments there are four minor slits 46 and 48 extending normal to the terminus points 38 and 40 on each side thereof. Each of the respective slits 46 and 48 end in minor terminus activation points 50, 52, 54 and 56.

Again as with the central elongated slit, the minor slits have walls 58 and 60 and 62 and 64 which are slightly spaced from one another forming the slits 46 and 48.

The trigger 20 has two positions as best seen in FIG. 2. The first is that shown in solid lines. The trigger is of course bendable when grasped by fingers around the flexible container 24 and can by snap displacement be moved to a second position in FIG. 2 shown in ghost lines. In other words the dish shaped portion 34 is displaced toward or beyond the coplanar rim 32. When finger pressure is applied and the displacement of the portion 34 occurs, the activator cuts 28 moves and there results an infinitesimal tearing of the metal at minor terminus activator points 50, 52, 54 and 56 wherein new metal is exposed and the initiation of the crystallization of the solution 22 commences.

The tearing action of points 50 through 56 is of course not great due to the fact that by providing a number of activator cuts the combination of microscopic tears insure the initiation of crystallization.

In addition and or importance is the fact that with the arrangement of the activator cuts 28 in any fashion around the dish shaped portion 34 there is much less chance of breaking the trigger 20 as has been encountered with the use of prior art triggers. The reason is that the activator points 50 through 56 of each activator cut 28 are not all on a common plane along the bending area of the portion 34. Further, because the minor terminus slits are preferably of less width than the central elongated slit there is not a weakening of the metal around the activator points and thus less chance of fracturing the adjacent metal to cause a complete tearing of the metal to the perimeter 30.

Further with the rim 32 surrounding the activator cuts 28 in the preferred embodiment there is no detrimental bending to cause a weakening of the metal and eventual breaking of the trigger 20.

In FIG. 12 there is illustrated a modified trigger 20'. The trigger 20' includes a dished shaped portion 34' that extends outwardly to the perimeter 30'. In other words there is no marginal rim as in the preferred embodiment. In this embodiment the activator cuts 28' are randomly formed in the dished portion 34'. In this way any snapping of the trigger 20' will not cause any breaking of the trigger because of the random arrangement.

In FIG. 13 there is illustrated a second modification of a trigger 20''. Again the trigger includes a dish shaped portion 34'' and no rim. In this particular arrangement there are two activator cuts 28'' which cross each other generally in the center of the portion 34''. At the ends 38'' and 40'' there are minor slits 46'' and 48'' as in the preferred embodiment.

FIGS. 14 and 15 illustrate a still further modified embodiment of a trigger 20'''. In this embodiment the trigger is elongated with parallel elongated edges 66 and 68 and end parallel edges 70 and 72 normal to the edges 66 and 68.

In side elevation, see FIG. 15, there is a raised central section 74 which is formed by bending the thin metal sheet at bend lines 76 and 78 which extend between elongated edges 68 and 70.

Activator cuts 28''' as described relative to the preferred embodiment are formed in the central section 74 and two exterior tab sections 80 and 82.

In operation the trigger 20''' may be flexed by finger pressure which will cause the tab section 80 and 82 to bend due to there bowed or curved construction.

In FIGS. 6 through 10 there are schematically illustrated the steps that may be used in forming a trigger 20. Preferably the trigger 20 is formed from a strip 84 of relatively thin metal that is passed under appropriate dies. In FIG. 6 the strip 84 is positioned between a pair of cutting dies and on the female die portion 90 which includes a V shaped cavity 92. Positioned above the strip 84 and aligned with the cavity 92 is a male die portion 94 including a V shaped male die 96.

The male die portion 94 is activated by any means such as a hydraulic stamping press and it will move downward and cut the activator cuts 28. The number and arrangement of cuts will depend on the design and construction of the dies 92 and 96. The die 96 preferable comprises merely a single V shaped knife cut. When the die 96 cuts the activator cut 28 the material at the ends 38 and 40 of the slit 36 will tear forming the minor slits 46 and 48.

The strip 84 with the activator cuts 28 then passes to a set of flattening dies with a female portion 98 and male portion 100. These dies each have flat faces 102 and 104 wherein the strip is flattened back to approximately its original flat condition. As the cut 36 has displaced metal in the strip 84 the flattening of the strip 84 will not close the slit 36 but merely return the strip to a generally flattened condition with a slight space or slit therebetween.

The next step includes a set of dish dies to impart the dish shaped portion 34 into the trigger 20. Here there is a dish shaped surface 106 formed in the female die portion 108. The male die 110 includes a complementary convex end dish portion 112. When the strip 84 is moved under the male die 110, it is activated and the strip is stamped forming the dish shaped portion 34 of the trigger 20.

The final step in forming the trigger 20 is seen in FIG. 10. Here there are cutting dies including a female die 112 with a circulate opening 114 wherein the diameter is greater than the dish shaped diameter. Also the male die 116 includes a cutting edge 118 complementary with the opening 112 so that the finished trigger 20 including the rim 32 is completed.

The invention and its attendant advantages will be understood from the foregoing description and it will be apparent that various changes may be made in the form, construction and arrangement of the parts without departing from the spirit and scope thereof or sacrificing its material advantages, the arrangements herebefore described being merely by way of example. I do not wish to be restricted to the specific forms shown except as defined in the accompanying claims, wherein various portions have been separated for clarity of reading and not for emphasis.

I claim:

1. A trigger to initiate crystallization of an aqueous salt solution, said trigger being in contact with said solution and said solution and trigger being confined within flexible container forming a heat pack wherein during crystallization the crystallization solution gives off heat from the exothermic reaction and the heat pack may be used for applying heat to the body where desired, said trigger comprising:

a thin wafer of metalic material having an external perimeter, said wafer including at least one activator cut extending through the thickness of said wafer and positioned inwardly of said exterior perimeter;

said activator cut including a first elongated slit formed by two opposed facing edges that are minutely spaced one from the other, said first slit including opposed terminus points, at least one minor slit at one or the other of said terminus points, and including at least one minor slit at one or the other of said terminus points angularly disposed thereto, wherein said minor slit is formed by two opposed facing edges that are minutely spaced one from the other, said minor slit communicating with said first elongated slit and said minor slit ending in a minor terminus activator point in said wafer: and said wafer having two positions between which it is bendable by finger pressure with snap displacement causing the minor terminus activator point to minutely initiate crystallization of said aqueous salt solution.

2. A trigger as defined in claim 1 wherein the wafer includes a dish shaped disc portion.

3. A trigger as defined in claim 2 wherein there is an annular rim around said dish shaped disc portion presenting a relatively flat coextensive plane in relation to said dish, and said rim is exteriorly defined by said exterior perimeter.

4. A trigger as defined in claim 1 wherein said minor slit extends normal to the direction of said first elongated slit.

5. A trigger as defined in claim 4 wherein a minor slit extends from each side of the end terminus of said first elongated slit forming an I and there are four minor terminus activator points in said wafer to initiate crystallization.

6. A trigger as defined in claim 3 wherein there are a plurality of activator cuts located within said dish shaped disc portion inwardly of said rim, each presenting a number of minor terminus activator points in said wafer.

7. A trigger as defined in claim 6 wherein the activator slits are randomly located in said trigger.

8. A trigger as defined in claim 1 wherein said wafer is rectangular having a central and two side portions with said central portion raised above said side portions and each of said side portion being bowed.

9. A trigger as defined in claim 8 wherein there are a plurality of activator cuts formed in said central and side portions inwardly of said perimeter.

* * * * *